(12) United States Patent
Hoshi

(10) Patent No.: US 6,456,441 B2
(45) Date of Patent: Sep. 24, 2002

(54) ZOOM LENS AND PHOTOGRAPHING APPARATUS HAVING THE SAME

(75) Inventor: Koji Hoshi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 09/749,930

(22) Filed: Dec. 29, 2000

(30) Foreign Application Priority Data

Jan. 7, 2000 (JP) ........................................ 2000-001470

(51) Int. Cl.$^7$ .............................................. G02B 15/14
(52) U.S. Cl. ........................ 359/687; 359/683; 359/684
(58) Field of Search ................................ 359/687, 683, 359/684, 686, 688, 676

(56) References Cited

U.S. PATENT DOCUMENTS

| | | | |
|---|---|---|---|
| 4,859,042 A | | 8/1989 | Tanaka ........................ 350/423 |
| 5,528,423 A | * | 6/1996 | Arimoto et al. ............. 359/687 |
| 5,557,470 A | * | 9/1996 | Shibayama .................. 359/687 |
| 5,572,364 A | | 11/1996 | Toide et al. ................. 359/649 |
| 5,574,599 A | | 11/1996 | Hoshi et al. ................. 359/689 |
| 5,815,320 A | | 9/1998 | Hoshi et al. ................. 359/686 |
| 5,831,772 A | | 11/1998 | Nishio et al. ................ 359/689 |
| 5,963,378 A | | 10/1999 | Tochigi et al. .............. 359/687 |
| 6,052,225 A | | 4/2000 | Hoshi ......................... 359/432 |
| 6,104,548 A | | 8/2000 | Nakayama et al. ......... 359/690 |

FOREIGN PATENT DOCUMENTS

| | | |
|---|---|---|
| JP | 62-24213 | 2/1987 |
| JP | 5-72472 | 3/1993 |
| JP | 6-27377 | 2/1994 |
| JP | 7-270684 | 10/1995 |

\* cited by examiner

*Primary Examiner*—Georgia Epps
*Assistant Examiner*—Tim Thompson
(74) *Attorney, Agent, or Firm*—Fitzpatrick, Cella, Harper & Scinto

(57) ABSTRACT

A zoom lens includes, in order from the object side to the image side, first, second, third and fourth lens units of positive, negative, positive and positive refractive powers, respectively, wherein at least the second, third and fourth lens units are moved in such a way that an interval between the first and second lens units becomes larger at a telephoto end than at a wide-angle end, the interval between the second and third lens units becomes smaller at the telephoto end than at the wide-angle end, and the interval between the third and fourth lens units becomes larger at the telephoto end than at the wide-angle end, and wherein the following conditions are satisfied:

$$-0.50 < M4/(f_T - f_W) < -0.05$$

$$0.03 < f_W/f_1 < 0.20$$

$$0.48 < L/f_W < 1.51$$

where M4 is the amount of movement of the fourth lens unit from the wide-angle end to the telephoto end (during zooming, $f_W$ and $f_T$ are the focal lengths of the zoom lens at the wide-angle end and the telephoto end, respectively, f1 is the focal length of the first lens unit, and L is the interval on an optical axis at the wide-angle end between a lens surface having the smallest refractive power in the third lens unit and a lens surface having the largest refractive power in the fourth lens unit.

11 Claims, 7 Drawing Sheets

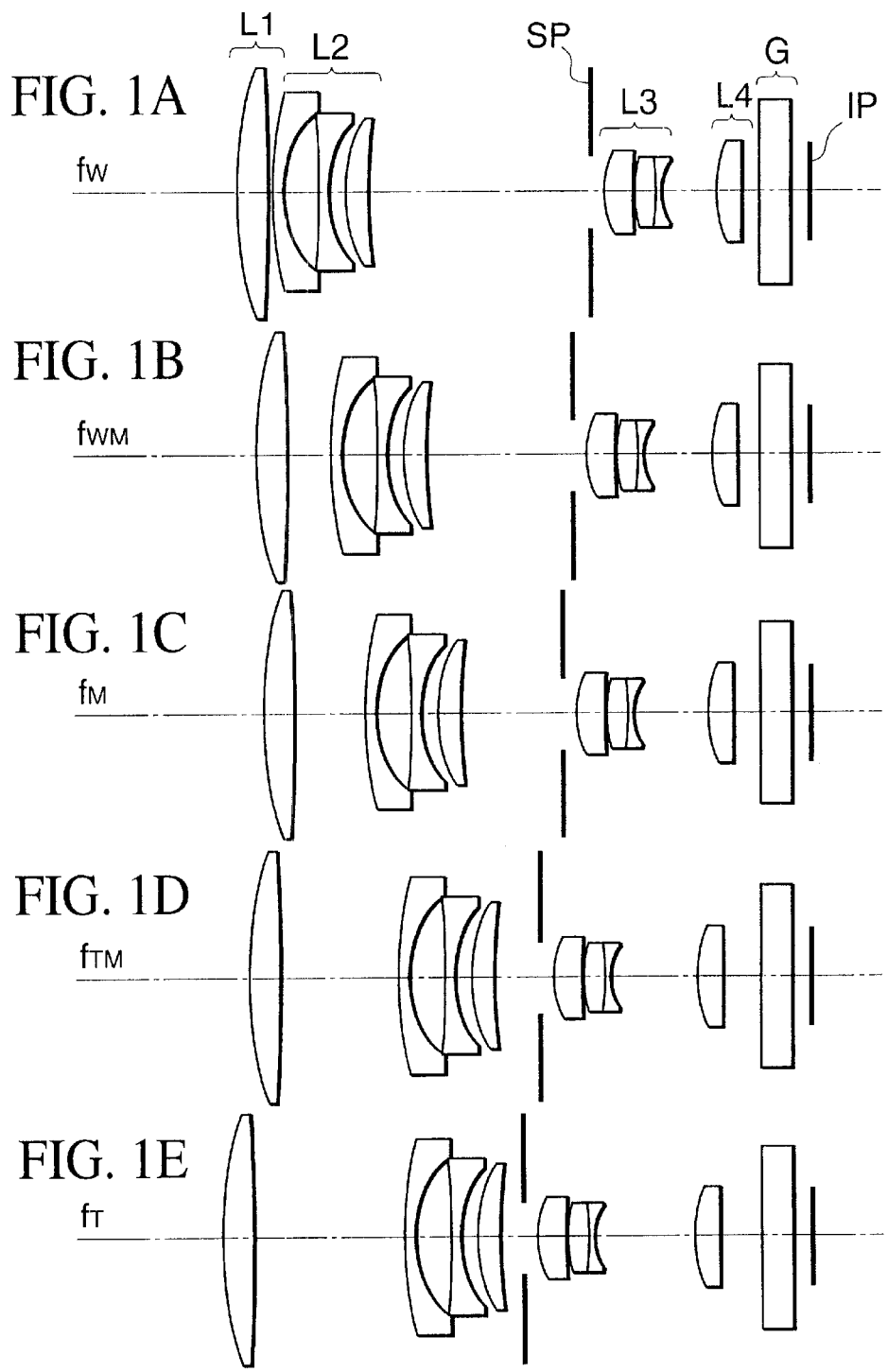

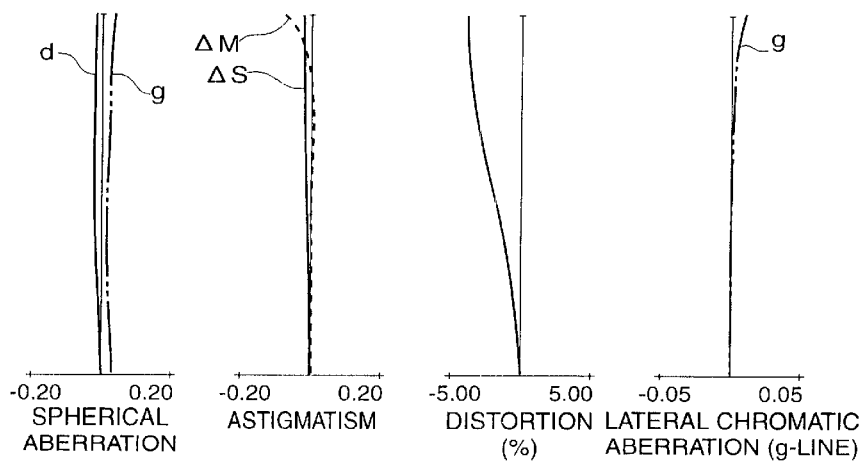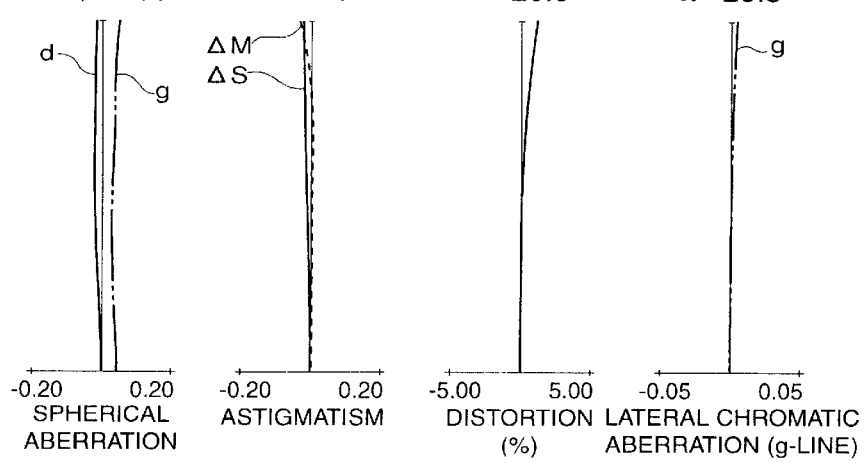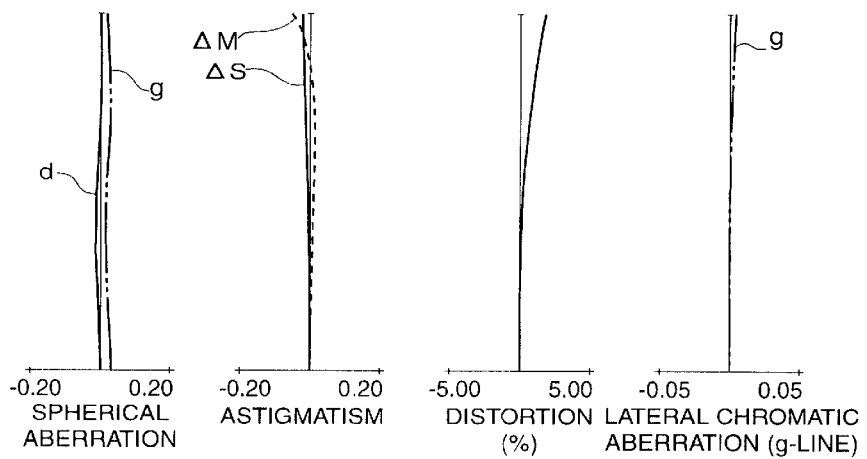

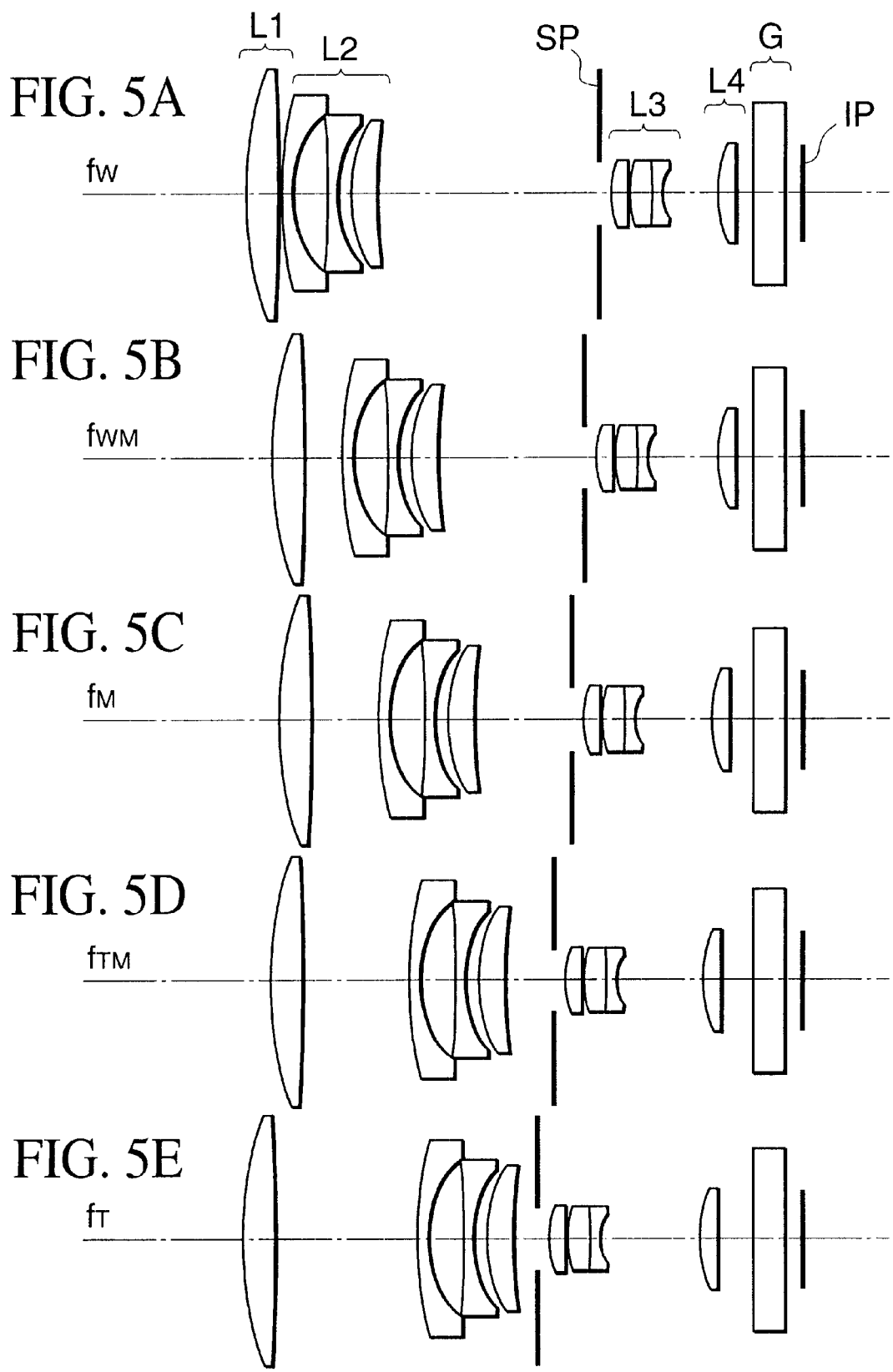

FIG. 6A — Fno/2.46 — SPHERICAL ABERRATION (-0.20 to 0.20), d, g
FIG. 6B — ω=32.6° — ASTIGMATISM (-0.20 to 0.20), ΔM, ΔS
FIG. 6C — ω=32.6° — DISTORTION (%) (-5.00 to 5.00)
FIG. 6D — ω=32.6° — LATERAL CHROMATIC ABERRATION (g-LINE) (-0.05 to 0.05), g

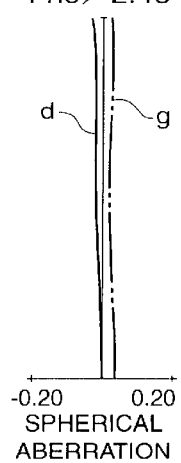
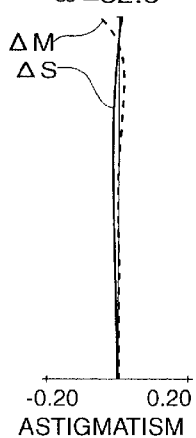
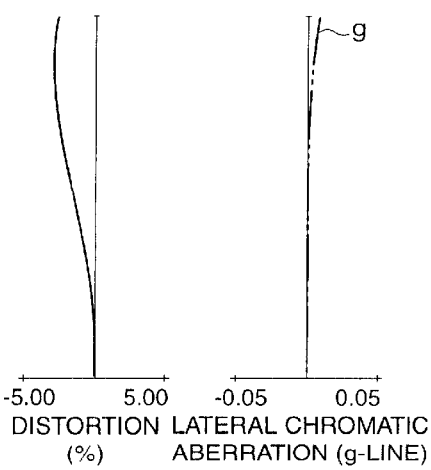

FIG. 7A — Fno/2.77 — SPHERICAL ABERRATION (-0.20 to 0.20), d, g
FIG. 7B — ω=20.5° — ASTIGMATISM (-0.20 to 0.20), ΔM, ΔS
FIG. 7C — ω=20.5° — DISTORTION (%) (-5.00 to 5.00)
FIG. 7D — ω=20.5° — LATERAL CHROMATIC ABERRATION (g-LINE) (-0.05 to 0.05), g

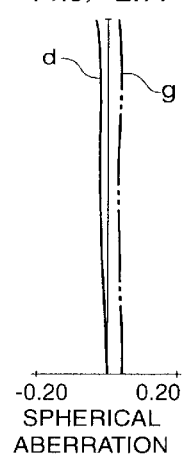
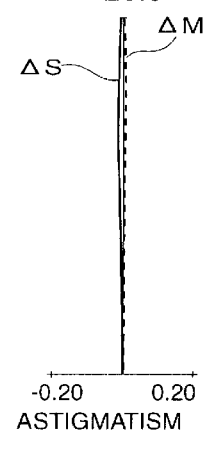
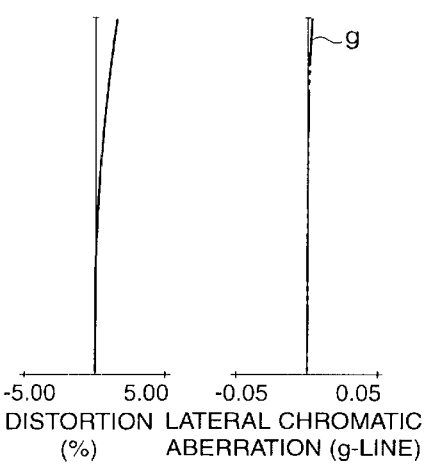

FIG. 8A — Fno/3.09 — SPHERICAL ABERRATION (-0.20 to 0.20), d, g
FIG. 8B — ω=12.4° — ASTIGMATISM (-0.20 to 0.20), ΔM, ΔS
FIG. 8C — ω=12.4° — DISTORTION (%) (-5.00 to 5.00)
FIG. 8D — ω=12.4° — LATERAL CHROMATIC ABERRATION (g-LINE) (-0.05 to 0.05), g

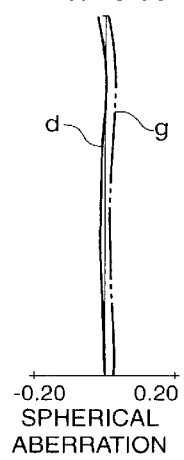
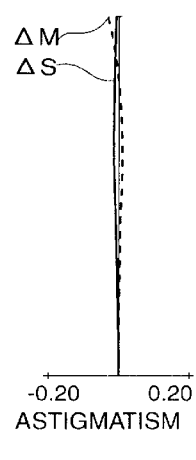
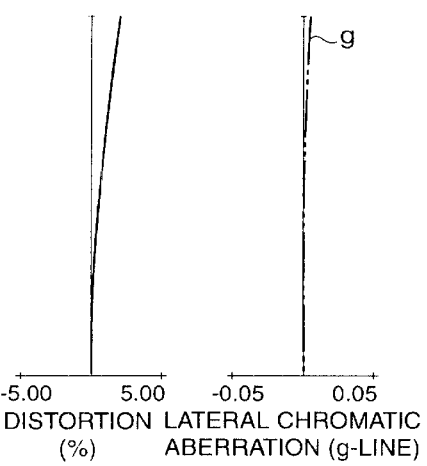

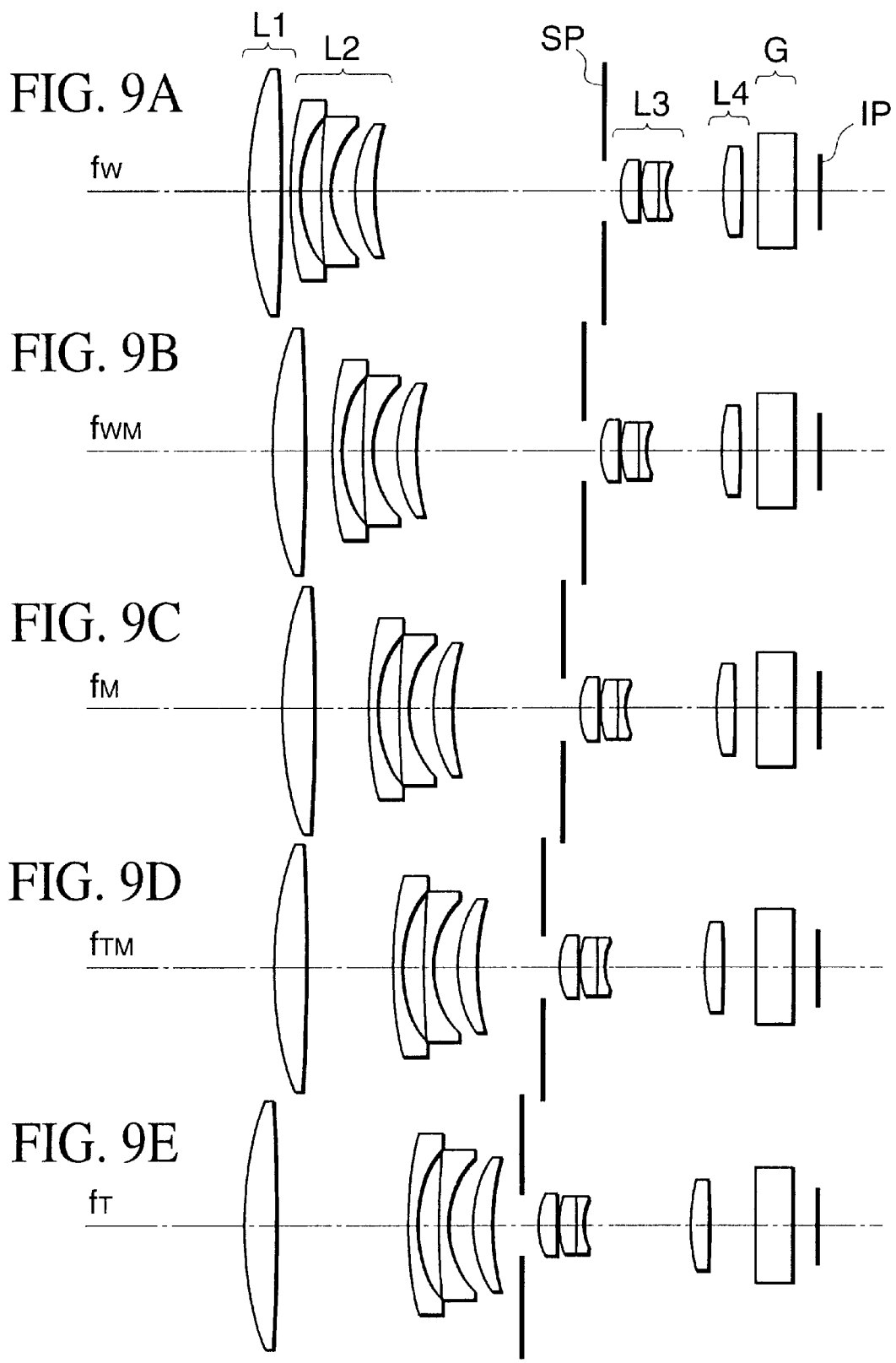

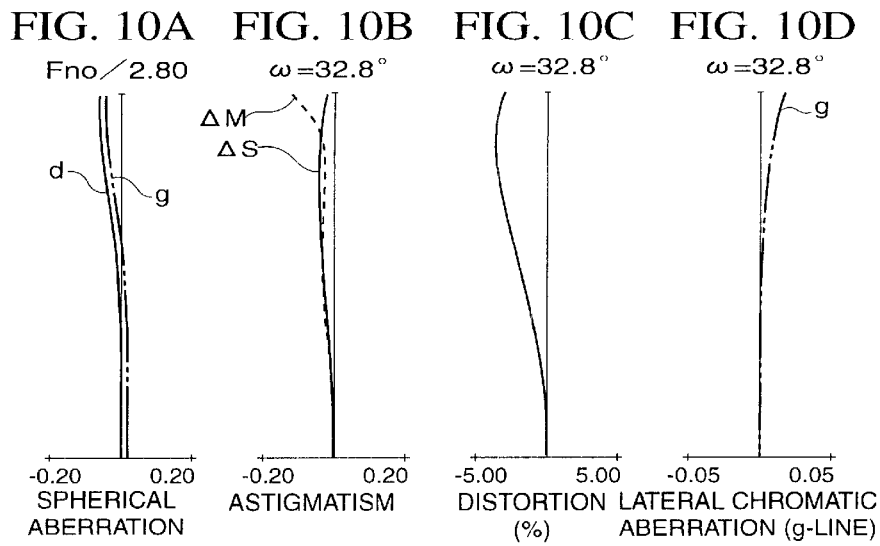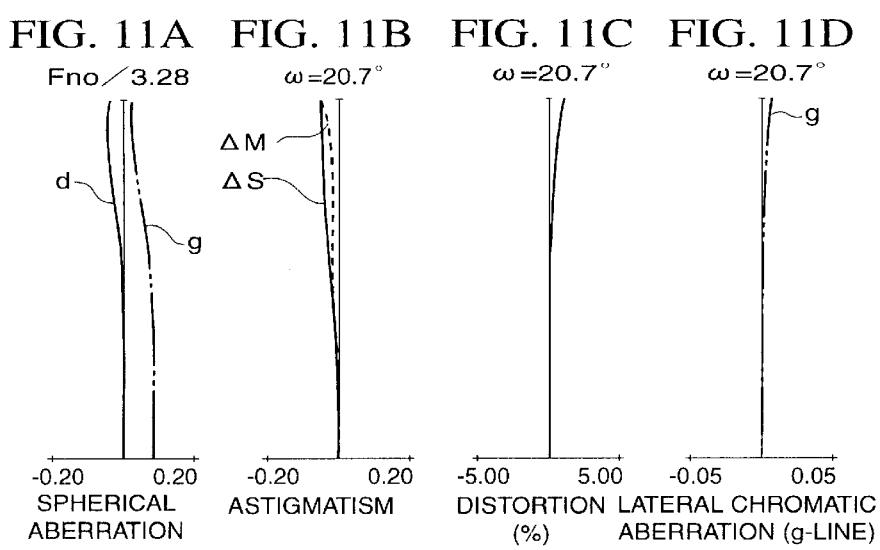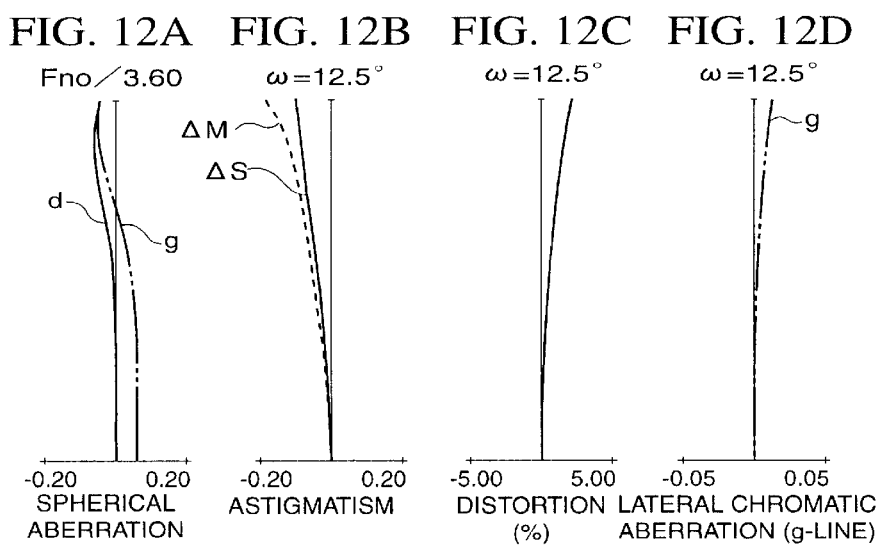

ZOOM LENS AND PHOTOGRAPHING APPARATUS HAVING THE SAME

BACKGROUND OF THE INVENTION

1. Field of the Invention

The present invention relates to a zoom lens and a photographing apparatus having the zoom lens, and more particularly to a zoom lens having four lens units, as a whole, in which a lens unit of positive refractive power leads, arranged to have high optical performance over the entire range of variation of magnification by appropriately setting the lens construction of the four lens units and the zoom type, and adapted for photographic cameras, video cameras, digital cameras, still video (SV) cameras, etc.

2. Description of Related Art

Heretofore, a variety of types of zoom lenses are used with photographing apparatuses, such as photographic cameras, video cameras, etc. For example, as a zoom lens for video cameras, in Japanese Laid-Open Patent Application No. Sho 62-24213 (corresponding to U.S. Pat. No. 4,859,042), there has been proposed a four-unit zoom lens which comprises four lens units of positive, negative, positive and positive refractive powers, respectively, in order from the object side to the image side, i.e., a first lens unit of positive refractive power arranged to be stationary during zooming, a second lens unit of negative refractive power arranged as a variator lens unit to move monotonically during zooming, a third lens unit of positive refractive power arranged to be stationary during zooming and a fourth lens unit of positive refractive power arranged as an image-plane compensator lens unit to move during zooming.

In addition, in Japanese Laid-Open Patent Application No. Hei 6-27377 (corresponding to U.S. Pat. No. 6,104,548), there has been proposed a three-unit zoom lens which comprises three lens units of positive, negative and positive refractive powers, respectively, in order from the object side to the image side, i.e., a first lens unit of positive refractive power arranged to be stationary during zooming, a second lens unit of negative refractive power arranged to move during zooming and a third lens unit of positive refractive power arranged to move during zooming.

Further, in each of Japanese Laid-Open Patent Application No. Hei 5-72472 (corresponding to U.S. Pat. No. 5,572,364) and Japanese Laid-Open Patent Application No. Hei 7-270684 (corresponding to U.S. Pat. No. 5,963,378), there is disclosed a zoom lens which comprises, in order from the object side to the image side, a first lens unit of positive refractive power arranged to be stationary during the variation of magnification and during focusing, a second lens unit of negative refractive power arranged to move to effect the variation of magnification, a third lens unit of positive refractive power arranged to be stationary and having a light-condensing action, and a fourth lens unit of positive refractive power arranged to move along the optical axis to compensate for the shift of an image plane due to the variation of magnification.

In recent years, a zoom lens for use with photographing apparatuses, such as single-lens reflex cameras, video cameras, etc., is desired to have a predetermined variable magnification ratio, to include a wide angle of view and to reduce the size of the entire lens system thereof.

In the four-unit zoom lens comprising four lens units of positive, negative, positive and positive refractive powers, respectively, for video cameras, proposed in the above Japanese Laid-Open Patent Application No. Sho 62-24213, the angle of view 2ω at the wide-angle end is less than 55° in most of the numerical examples thereof. Accordingly, a small-sized zoom lens having a wider angle of view is desired.

Further, since the variation of magnification is effected almost by moving the second lens unit only, the refractive power of each of the second lens unit and the first lens unit is made strong, and, in addition, since the compensation for the shift of the image plane is effected almost by moving the fourth lens unit only, it is difficult to suppress the variation of aberration occurring during zooming.

In general, in a zoom lens, if the refractive power of each lens unit is strengthened, the amount of movement of each lens unit required for obtaining a predetermined variable magnification ratio becomes small, so that it becomes possible to obtain a wider angle of view while shortening the total length of the entire lens system.

However, if the refractive power of each lens unit is merely strengthened, the variation of aberration due to the variation of magnification becomes large, so that, when a wider angle of view is intended to be obtained particularly, it disadvantageously becomes difficult to obtain good optical performance over the entire range of variation of magnification.

BRIEF SUMMARY OF THE INVENTION

It is an object of the invention to provide a zoom lens arranged to have a wide angle of view, to have high optical performance over the entire range of variation of magnification, and to reduce the size of the entire lens system by appropriately setting the refractive power of each lens unit, the lens construction, the movement condition of each lens unit during the variation of magnification, etc., and to provide a photographing apparatus having the zoom lens.

To attain the above object, in accordance with an aspect of the invention, there is provided a zoom lens, which comprises, in order from an object side to an image side, a first lens unit of positive refractive power, a second lens unit of negative refractive power, a third lens unit of positive refractive power, and a fourth lens unit of positive refractive power, wherein at least the second lens unit, the third lens unit and the fourth lens unit are moved in such a way that the interval between the first lens unit and the second lens unit becomes larger at the telephoto end than at the wide-angle end, the interval between the second lens unit and the third lens unit becomes smaller at the telephoto end than at the wide-angle end, and the interval between the third lens unit and the fourth lens unit becomes larger at the telephoto end than at the wide-angle end, and wherein the zoom lens satisfies the following conditions:

$$-0.50 < M4/(f_T - f_W) < -0.05$$

$$0.03 < f_W/f_1 < 0.20$$

$$0.48 < L/f_W < 1.51$$

where M4 is the amount of movement of the fourth lens unit from the wide-angle end to the telephoto end during zooming, $f_W$ and $f_T$ are the focal lengths of the zoom lens at the wide-angle end and the telephoto end, respectively, $f_1$ is the focal length of the first lens unit, and L is an interval on an optical axis at the wide-angle end between a lens surface having the smallest refractive power among lens surfaces included in the third lens unit and a lens surface having the largest refractive power among lens surfaces included in the fourth lens unit.

In the zoom lens according to the above aspect of the invention, the amount of movement M4 of the fourth lens unit from the wide-angle end to the telephoto end during zooming takes a positive sign when the fourth lens unit moves in a direction toward the image side. Further, the smallest refractive power and the largest refractive power of the lens surfaces included in the third lens unit and the fourth lens unit are determined with positive or negative signs thereof taken into consideration, and the negative refractive power is assumed to become smaller accordingly as the absolute value thereof becomes larger, and is assumed to be smaller than a positive refractive power having any absolute value.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 1A to 1E are sectional views of a zoom lens according to a numerical example 1 of the invention in the respective zoom positions thereof.

FIGS. 2A to 2D are aberration diagrams showing the various aberrations occurring in the zoom lens according to the numerical example 1 at the wide-angle end.

FIGS. 3A to 3D are aberration diagrams showing the various aberrations occurring in the zoom lens according to the numerical example 1 at the middle focal-length position.

FIGS. 4A to 4D are aberration diagrams showing the various aberrations occurring in the zoom lens according to the numerical example 1 at the telephoto end.

FIGS. 5A to 5E are sectional views of a zoom lens according to a numerical example 2 of the invention in the respective zoom positions thereof.

FIGS. 6A to 6D are aberration diagrams showing the various aberrations occurring in the zoom lens according to the numerical example 2 at the wide-angle end.

FIGS. 7A to 7D are aberration diagrams showing the various aberrations occurring in the zoom lens according to the numerical example 2 at the middle focal-length position.

FIGS. 8A to 8D are aberration diagrams showing the various aberrations occurring in the zoom lens according to the numerical example 2 at the telephoto end.

FIGS. 9A to 9E are sectional views of a zoom lens according to a numerical example 3 of the invention in the respective zoom positions thereof.

FIGS. 10A to 10D are aberration diagrams showing the various aberrations occurring in the zoom lens according to the numerical example 3 at the wide-angle end.

FIGS. 11A to 11D are aberration diagrams showing the various aberrations occurring in the zoom lens according to the numerical example 3 at the middle focal-length position.

FIGS. 12A to 12D are aberration diagrams showing the various aberrations occurring in the zoom lens according to the numerical example 3 at the telephoto end.

DETAILED DESCRIPTION OF THE INVENTION

Figure 13A:
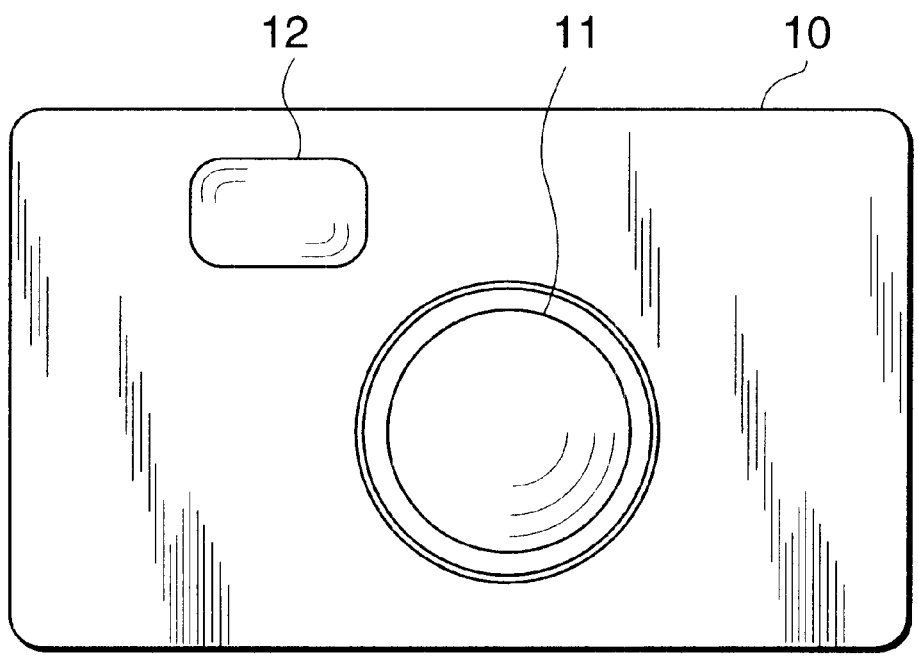
FIGS. 13A and 13B are schematic diagrams showing the essential parts of a photographing apparatus according to the invention.

Hereinafter, preferred embodiments of the invention will be described in detail with reference to the drawings.

FIGS. 1A to 1E, FIGS. 2A to 2D, FIGS. 3A to 3D and FIGS. 4A to 4D are a sectional view and aberration diagrams of a zoom lens according to a numerical example 1 of the invention.

FIGS. 5A to 5E, FIGS. 6A to 6D, FIGS. 7A to 7D and FIGS. 8A to 8D are a sectional view and aberration diagrams of a zoom lens according to a numerical example 2 of the invention.

FIGS. 9A to 9E, FIGS. 10A to 10D, FIGS. 11A to 11D and FIGS. 12A to 12D are a sectional view and aberration diagrams of a zoom lens according to a numerical example 3 of the invention.

In a photographing apparatus according to the invention, the zoom lens shown in FIGS. 1A to 1E, FIGS. 5A to 5E or FIGS. 9A to 9E is used to form an object image on an image pickup means (a photoelectric conversion element, such as a CCD).

In the lens sectional views, FIGS. 1A, 5A and 9A each illustrate the position of each lens unit at the wide-angle end (the focal length $f_W$), FIGS. 1B, 5B and 9B each illustrate the position of each lens unit at a zoom position (the focal length $f_{WM}$) between the wide-angle end and the middle focal-length position, FIGS. 1C, 5C and 9C each illustrate the position of each lens unit at a zoom position (the focal length $f_M$) for the middle focal-length position, FIGS. 1D, 5D and 9D each illustrate the position of each lens unit at a zoom position (the focal length $f_{TM}$) between the middle focal-length position and the telephoto end, and FIGS. 1E, 5E and 9E each illustrate the position of each lens unit at the telephoto end (the focal length $f_T$).

In the aberration diagrams for the numerical examples 1 to 3, FIGS. 2A to 2D, FIGS. 6A to 6D and FIGS. 10A to 10D are aberration diagrams for the wide-angle end (the focal length $f_W$), FIGS. 3A to 3D, FIGS. 7A to 7D and FIGS. 11A to 11D are aberration diagrams for the zoom position (the focal length $f_M$) for the middle focal length position, and FIGS. 4A to 4D, FIGS. 8A to 8D and FIGS. 12A to 12D are aberration diagrams for the telephoto end (the focal length $f_T$).

In the lens sectional views, reference character L1 denotes a first lens unit of positive refractive power, reference character L2 denotes a second lens unit of negative refractive power, reference character L3 denotes a third lens unit of positive refractive power, and reference character L4 denotes a fourth lens unit of positive refractive power. Reference character SP denotes an aperture stop, which is disposed in front of the third lens unit L3. Reference character G denotes a glass block, which is equivalent to a color separation prism, a face plate, a filter or the like. Reference character IP denotes an image plane, on which an image sensor, such as a CCD, is disposed.

In the present embodiment, during the variation of magnification from the wide-angle end to the telephoto end, the first lens unit L1 moves while having a locus convex toward the image side, the second lens unit L2 moves toward the image side, and the third lens unit L3 and the fourth lens unit L4 move toward the object side.

In this instance, the interval between the first lens unit L1 and the second lens unit L2 becomes larger at the telephoto end than at the wide-angle end, the interval between the second lens unit L2 and the third lens unit L3 becomes smaller at the telephoto end than at the wide-angle end, and the interval between the third lens unit L3 and the fourth lens unit L4 becomes larger at the telephoto end than at the wide-angle end.

With such an adopted zoom-type lens, the variable magnification function and the image-plane compensation function are shared by the first to fourth lens units, so that it is possible to improve optical performance over the entire range of variation of magnification while reducing the size of the entire lens system.

Then, in order to obtain high optical performance over the entire range of variation of magnification and over the entire object distance range, the following conditions are satisfied:

$$-0.50 < M4/(f_T - f_W) < -0.05 \quad (1)$$

$$0.03 < f_W/f_1 < 0.20 \quad (2)$$

$$0.48 < L/f_W < 1.51 \quad (3)$$

where M4 is the amount of movement of the fourth lens unit from the wide-angle end to the telephoto end during zooming, $f_W$ and $f_T$ are the focal lengths of the zoom lens at the wide-angle end and the telephoto end, respectively, $f_1$ is the focal length of the first lens unit, and L is the interval on an optical axis at the wide-angle end between a lens surface having the smallest refractive power among lens surfaces included in the third lens unit and a lens surface having the largest refractive power among lens surfaces included in the fourth lens unit. Further, the amount of movement M4 of the fourth lens unit from the wide-angle end to the telephoto end during zooming takes a positive sign when the fourth lens unit moves in a direction toward the image side. Further, the smallest refractive power and the largest refractive power of the lens surfaces included in the third lens unit and the fourth lens unit are determined with positive or negative signs thereof taken into consideration, and a negative refractive power is assumed to become smaller accordingly as an absolute value thereof becomes larger, and is assumed to be smaller than a positive refractive power having any absolute value.

The condition (1) is concerned with the ratio of the amount of movement of the fourth lens unit to a change of the focal length due to zooming (variation of magnification). If the lower limit of the condition (1) is exceeded, the amount of movement of the fourth lens unit toward the object side becomes large, so that the function of decreasing the variation of magnification at the fourth lens unit becomes strong disadvantageously. If the upper limit of the condition (1) is exceeded, the amount of movement of the fourth lens unit becomes small, so that the function of compensating for the shift of an image plane at the fourth lens unit becomes weak disadvantageously.

Further, desirably, it is preferable to alter the lower limit and the upper limit of the condition (1) as follows:

$$-0.45 < M4/(f_T - f_W) < -0.10 \quad (1a)$$

The condition (2) is concerned with the focal length of the first lens unit. If the upper limit of the condition (2) is exceeded, a refractive power of the first lens unit becomes too strong, so that the diameter of the front lens member becomes large, thereby disadvantageously making it difficult to obtain a wide angle of view. Further, in order to improve optical performance, the number of constituent lens elements of the first lens unit is disadvantageously caused to increase. If the lower limit of the condition (2) is exceeded, the magnification varying function of the second lens unit by the movement of the second lens unit becomes weak disadvantageously.

Further, desirably, it is preferable to alter the upper limit and the lower limit of the condition (2) as follows:

$$0.05 < f_W/f_1 < 0.15 \quad (2a)$$

The condition (3) is concerned with the interval between the third lens unit and the fourth lens unit at the wide-angle end. If the interval becomes longer beyond the upper limit of the condition (3), the total lens length becomes long, disadvantageously hindering a reduction of the size of the entire lens system. If the interval becomes shorter beyond the lower limit of the condition (3), it becomes impossible for the fourth lens unit to sufficiently secure changes of the interval between the third lens unit and the fourth lens unit during the variation of magnification so as to cancel spherical aberration, astigmatism and coma occurring in the third lens unit, so that it becomes difficult to obtain a large aperture ratio and a high magnification.

Further, desirably, it is preferable to alter the upper limit and the lower limit of the condition (3) as follows:

$$0.68 < L/f_W < 1.31 \quad (3a)$$

In addition, in any one of the numerical examples 1 to 3, focusing is effected by moving the fourth lens unit only. In the zoom lens according to the invention, focusing may be effected by moving the fourth lens unit only, as mentioned above, focusing may be effected by moving the fourth lens unit and the second lens unit selectively according to the variable magnification position or in a predetermined relationship, or focusing may be effected by moving the entire lens system or the image sensor on an image plane.

Next, a photographing apparatus having a zoom lens according to any one of the numerical examples 1 to 3 will be described, as an embodiment of the invention, with reference to FIGS. 13A and 13B.

Figure 13B:
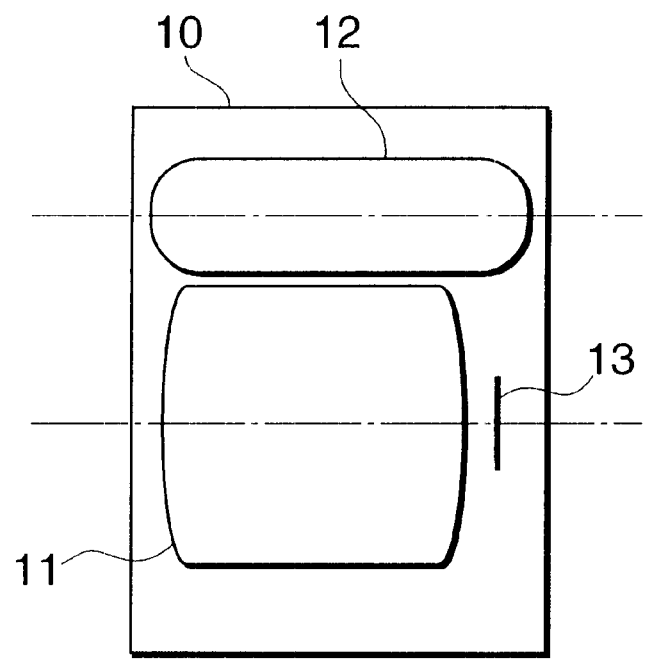

FIG. 13A is a front view of the photographing apparatus, and FIG. 13B is a side sectional view of the photographing apparatus. In FIGS. 13A and 13B, reference numeral 10 denotes a photographing apparatus body (casing), reference numeral 11 denotes a photographic optical system using a zoom lens according to any one of the numerical examples 1 to 3, reference numeral 12 denotes a viewfinder optical system, and reference numeral 13 denotes an image sensor, such as a CCD.

With the zoom lens according to any one of the numerical examples 1 to 3 applied to the photographic optical system of the photographing apparatus, it is possible to realize a compact photographing apparatus.

While the zoom lens according to the invention can be realized by satisfying the above-described lens construction, in order to keep good optical performance while keeping a high variable magnification ratio, it is desirable to satisfy at least one of the following conditions (a–1) to (a–9).

(a–1) The following conditions are satisfied:

$$0.50 < (B2_W - B2_M)/(B2_W - B2_T) < 0.75 \quad (4)$$

$$B3_W < B3_M B3_T \quad (5)$$

where $Bi_W$ and $Bi_T$ are intervals on the optical axis between the i-th lens unit and the (i+1)th lens unit at the wide-angle end and at the telephoto end, respectively, $Bi_M$ is an interval on the optical axis between the i-th lens unit and the (i+1)th lens unit at a position for the variation of magnification where the focal length of the entire zoom lens becomes a geometrical mean of the focal lengths $f_W$ and $f_T$ expressed by the following equation:

$$f_M = \sqrt{(f_W \times f_T)}.$$

The condition (4) is concerned with the interval on the optical axis between the second lens unit and the third lens unit. If the upper limit of the condition (4) is exceeded, a change of the interval between the second lens unit and the third lens unit at the variable magnification range on the wide-angle side from the wide-angle end to the middle focal-length position becomes large, so that it becomes difficult to obtain a high variable magnification ratio of the entire zoom lens. If the lower limit of the condition (4) is exceeded, it becomes difficult to correct well aberration at the middle area in the range of variation of magnification.

Further, desirably, it is preferable to alter the upper limit and the lower limit of the condition (4) as follows:

$$0.55 < (B2_W - B2_M)/(B2_W - B2_T) < 0.70 \quad (4a).$$

The condition (5) is concerned with the interval $B3_M$ on the optical axis between the third lens unit and the fourth lens unit. If the interval $B3_M$ exceeds the upper limit of the condition (5), it becomes difficult to correct, by the fourth lens unit, the various aberrations occurring in the third lens unit, in particular, longitudinal chromatic aberration, so that it becomes difficult to correct well aberration with the third lens unit and the fourth lens unit each formed in a simple lens construction. If the interval $B3_M$ becomes smaller beyond the lower limit of the condition (5), the interval between the third lens unit and the fourth lens unit becomes large at the wide-angle end, so that it becomes difficult to secure a sufficient back focal distance.

Further, desirably, it is preferable to alter the upper limit and the lower limit of the condition (5) as follows:

$$1.1 \times B3_W < B3_M < 0.9 \times B3_T \quad (5a).$$

(a-2) The following condition is satisfied:

$$0.35 < f_W/|f_2| < 0.80 \quad (6)$$

where $f_2$ is the focal length of the second lens unit.

The condition (6) is concerned with the focal length of the second lens unit. If the upper limit of the condition (6) is exceeded, a refractive power of the second lens unit becomes strong, making the variation of aberration during the variation of magnification large, so that it becomes difficult to obtain a high variable magnification ratio while keeping high optical performance. If the lower limit of the condition (6) is exceeded, a refractive power of the second lens unit becomes weak, so that the total lens length becomes long, thereby making it difficult to reduce the size of the entire lens system.

Further, desirably, it is preferable to alter the upper limit and the lower limit of the condition (6) as follows:

$$0.40 < f_W/|f_2| < 0.60 \quad (6a).$$

(a-3) When the magnification of the entire lens system is varied from the wide-angle end to the telephoto end, the first lens unit makes an inverted motion from a movement toward the image side to a movement toward the object side with respect to an image plane of the entire lens system.

By this arrangement, it becomes easy to reduce the size of the entire lens system in the middle of the variation of magnification and to improve optical performance.

(a-4) The first lens unit consists of a single lens.

(a-5) The third lens unit has a positive lens and a negative lens, and has at least one aspheric surface.

While the third lens unit and the fourth lens unit bear the image forming function of the entire lens system, with the third lens unit arranged to have a positive lens and a negative lens, it is possible to correct well chromatic aberration. Further, with the third lens unit arranged to have at least one aspheric surface, it becomes easy to simplify the lens construction and to reduce the size of the entire lens system.

(a-6) The fourth lens unit consists of a single lens.

In the zoom lens according to the invention, a plurality of lens units share the magnification varying function and the image-plane compensating function, so that it is possible to improve optical performance in the middle of the variation of magnification.

Therefore, even if each of the first lens unit and the fourth lens unit is composed of only one positive lens, it is easy to correct well aberration.

(a-7) The fourth lens unit has at least one aspheric surface.

With the fourth lens unit arranged to have an aspheric surface, it becomes easy to correct aberration better with a simple lens construction.

(a-8) There is disposed a stop which moves integrally with the third lens unit when the magnification of the entire lens system is varied from the wide-angle end to the telephoto end.

With the stop arranged to move integrally with the third lens unit, it is possible to simplify the structure of a lens barrel.

(a-9) It is preferable that the second lens unit L2 is constructed with, in order from the object side to the image side, a negative lens of meniscus form having a concave surface facing the image side which is stronger in refractive power than a surface thereof facing the object side, a negative lens of bi-concave form, and a positive lens of meniscus form having a convex surface facing the object side which is stronger in refractive power than a surface thereof facing the image side.

Next, numerical data of the numerical examples 1 to 3 of the invention are shown. In the numerical data of the numerical examples 1 to 3, ω denotes a half angle of view, ri denotes the radius of curvature of the i-th surface, when counted from the object side, di denotes the separation between the i-th surface and the (i+1)th surface, when counted from the object side, ni and vi respectively denote the refractive index and Abbe number of the i-th optical member, when counted from the object side.

The shape of an aspheric surface is expressed in the coordinates with an X axis in the optical axis direction (the direction in which light advances) and a Y axis in the direction perpendicular to the optical axis, by the following equation:

$$X = \frac{(1/R)Y^2}{1 + \sqrt{1 - (1+K)(Y/R)^2}} + AY^2 + BY^4 + CY^6 + DY^8 + EY^{10}$$

where R is the radius of curvature of a central portion of the aspheric surface, and K, A, B, C, D, E are aspheric coefficients. Further, the indication "e-X" means "×10$^{-x}$".

In addition, the values of the factors in the above-mentioned conditions (1) to (6) for the numerical examples 1 to 3 are listed in Table-1.

Numerical Example 1:

f = 7.13 – 20.74  Fno = 1:2.06 – 2.74  2ω = 65.10° – 24.7°

| | | | |
|---|---|---|---|
| r 1 = 42.187 | d 1 = 3.59 | n 1 = 1.51633 | ν 1 = 64.1 |
| r 2 = –270.444 | d 2 = Variable | | |
| r 3 = 47.518 | d 3 = 1.10 | n 2 = 1.74950 | ν 2 = 35.3 |
| r 4 = 12.465 | d 4 = 3.92 | | |
| r 5 = –110.261 | d 5 = 1.00 | n 3 = 1.69350 | ν 3 = 53.2 |
| r 6 = 12.868 | d 6 = 1.92 | | |
| r 7 = 16.074 | d 7 = 2.52 | n 4 = 1.84666 | ν 4 = 23.9 |
| r 8 = 58.740 | d 8 = Variable | | |
| r 9 = (Stop) | d 9 = 1.40 | | |
| r10 = 9.555 | d10 = 3.24 | n 5 = 1.88300 | ν 5 = 40.8 |
| r11 = 152.382 | d11 = 0.20 | | |
| r12 = 10.734* | d12 = 2.33 | n 6 = 1.74330 | ν 6 = 49.3 |
| r13 = –21.530 | d13 = 0.50 | n 7 = 1.84666 | ν 7 = 23.9 |
| r14 = 5.998 | d14 = Variable | | |
| r15 = 14.605* | d15 = 2.81 | n 8 = 1.80610 | ν 8 = 40.7 |
| r16 = –2569.904 | d16 = Variable | | |
| r17 = ∞ | d17 = 3.39 | n 9 = 1.51633 | ν 9 = 64.1 |
| r18 = ∞ | | | |

Focal Length

| Variable Separation | $f_W$ 7.13 | $f_{WM}$ 9.84 | $f_M$ 12.16 | $f_{TM}$ 16.95 | $f_T$ 20.74 |
|---|---|---|---|---|---|
| d 2 | 0.60 | 4.87 | 7.82 | 12.98 | 16.82 |
| d 8 | 24.20 | 15.77 | 10.99 | 4.86 | 2.38 |
| d14 | 6.19 | 7.49 | 8.23 | 9.58 | 11.17 |
| d16 | 1.99 | 2.61 | 3.24 | 4.38 | 4.72 |

Aspheric Coefficients:

| r12 | K = 5.8879e–01 | A = 0  B = –2.3434e–04 | C = –7.1248e–06 |
|---|---|---|---|
| | D = 1.9697e–07 | E = –7.0817e–09 | |
| r15 | K = 7.6056e–01 | A = 0  B = –7.7450e–04 | C = 1.6084e–07 |
| | D = –4.6010e–09 | E = 5.9585e–12 | |

Numerical Example 2:

f = 7.12 – 20.74  Fno = 1:2.46 – 3.09  2ω = 65.2° – 24.7°

| | | | |
|---|---|---|---|
| r 1 = 39.033 | d 1 = 3.72 | n 1 = 1.51633 | ν 1 = 64.1 |
| r 2 = –305.340 | d 2 = Variable | | |
| r 3 = 43.246 | d 3 = 1.10 | n 2 = 1.83400 | ν 2 = 37.2 |
| r 4 = 12.333 | d 4 = 3.79 | | |
| r 5 = –131.086 | d 5 = 0.90 | n 3 = 1.74400 | ν 3 = 44.8 |
| r 6 = 13.024 | d 6 = 1.61 | | |
| r 7 = 15.775 | d 7 = 2.96 | n 4 = 1.84666 | ν 4 = 23.9 |
| r 8 = 93.231 | d 8 = Variable | | |
| r 9 = (Stop) | d 9 = 1.20 | | |
| r10 = 9.337 | d10 = 1.90 | n 5 = 1.88300 | ν 5 = 40.8 |
| r11 = 317.699 | d11 = 0.20 | | |
| r12 = 11.319* | d12 = 2.67 | n 6 = 1.74330 | ν 6 = 49.3 |
| r13 = –21.180 | d13 = 0.90 | n 7 = 1.84666 | ν 7 = 23.9 |
| r14 = 5.605 | d14 = Variable | | |
| r15 = 14.085* | d15 = 2.06 | n 8 = 1.80610 | ν 8 = 40.7 |
| r16 = –425.794 | d16 = Variable | | |
| r17 = ∞ | d17 = 3.39 | n 9 = 1.51633 | ν 9 = 64.1 |
| r18 = ∞ | | | |

Focal Length

| Variable Separation | $f_W$ 7.12 | $f_{WM}$ 9.73 | $f_M$ 12.15 | $f_{TM}$ 16.71 | $f_T$ 20.74 |
|---|---|---|---|---|---|
| d 2 | 0.60 | 4.42 | 7.37 | 12.18 | 16.13 |
| d 8 | 24.38 | 16.07 | 10.95 | 4.96 | 2.16 |
| d14 | 6.20 | 7.47 | 8.26 | 9.53 | 11.00 |
| d16 | 1.98 | 2.51 | 3.11 | 4.09 | 4.43 |

Aspheric Coefficients:

| r12 | K = 3.9730e–01 | A = 0  B = –1.9350e–04 | C = –5.3568e–06 |
|---|---|---|---|
| | D = 9.4519e–08 | E = –1.3834e–09 | |
| r15 | K = 6.8658e–01 | A = 0  B = –7.9908e–05 | C = 2.0920e–08 |
| | D = –1.1588e–10 | E = –7.0620e–11 | |

Numerical Example 3:

f = 5.09 – 14.81  Fno = 1:2.80 – 3.60  2ω = 65.5° – 24.9°

| | | | |
|---|---|---|---|
| r 1 = 39.435 | d 1 = 2.81 | n 1 = 1.51633 | ν 1 = 64.1 |
| r 2 = –107.755 | d 2 = Variable | | |
| r 3 = 31.111 | d 3 = 0.80 | n 2 = 1.83481 | ν 2 = 42.7 |
| r 4 = 11.077 | d 4 = 1.97 | | |
| r 5 = 182.858 | d 5 = 0.60 | n 3 = 1.77250 | ν 3 = 49.6 |
| r 6 = 8.472 | d 6 = 2.15 | | |
| r 7 = 11.082 | d 7 = 1.76 | n 4 = 1.84666 | ν 4 = 23.9 |
| r 8 = 23.848 | d 8 = Variable | | |
| r 9 = (Stop) | d 9 = 1.60 | | |
| r10 = 6.771* | d10 = 1.57 | n 5 = 1.80610 | ν 5 = 40.7 |
| r11 = –136.850 | d11 = 0.20 | | |
| r12 = 7.031 | d12 = 1.39 | n 6 = 1.69680 | ν 6 = 55.5 |
| r13 = 68.747 | d13 = 0.50 | n 7 = 1.84666 | ν 7 = 23.9 |
| r14 = 3.997 | d14 = Variable | | |
| r15 = 15.333* | d15 = 1.52 | n 8 = 1.74330 | ν 8 = 49.3 |
| r16 = –41.507 | d16 = Variable | | |
| r17 = ∞ | d17 = 3.12 | n 9 = 1.51633 | ν 9 = 64.1 |
| r18 = ∞ | | | |

Focal Length

| Variable Separation | $f_W$ 5.09 | $f_{WM}$ 6.68 | $f_M$ 8.68 | $f_{TM}$ 11.40 | $f_T$ 14.81 |
|---|---|---|---|---|---|
| d 2 | 0.60 | 2.17 | 4.37 | 7.42 | 11.11 |
| d 8 | 14.79 | 14.28 | 9.66 | 5.59 | 2.40 |
| d14 | 5.17 | 6.71 | 7.81 | 8.62 | 9.27 |
| d16 | 1.41 | 1.61 | 2.19 | 3.16 | 4.24 |

Aspheric Coefficients:

| r10 | K = –2.6409e+00 | A = 0  B = 7.4350e–04 | C = –7.7892e–06 |
|---|---|---|---|
| | D = –1.4715e–07 | E = –2.8355e–10 | |
| r15 | K = 4.2144e+00 | A = 0  B = –1.8509e–04 | C = –3.6863e–06 |
| | D = 2.8349e–08 | E = 1.8786e–09 | |

*Aspheric Surface

It is to be noted that, in the numerical example 3, while the first lens unit makes an inverted motion, each of the second, third and fourth lens units makes a monotonous motion in one direction.

TABLE 1

| | Condition | Numerical Example 1 | Numerical Example 2 | Numerical Example 3 |
|---|---|---|---|---|
| (1) | $M4/(f_T-f_W)$ | –0.20 | –0.18 | –0.29 |
| (2) | $f_W/f_1$ | 0.10 | 0.11 | 0.09 |
| (3) | $L/f_W$ | 0.87 | 0.87 | 1.02 |
| (4) | $(B2_W-B2_M)/(B2_W-B2_T)$ | 0.61 | 0.60 | 0.58 |
| (5) | $B3_T$ | 11.17 | 11.00 | 9.27 |
| | $B3_M$ | 8.23 | 8.26 | 7.81 |
| | $B3_W$ | 6.19 | 6.20 | 5.17 |
| (5a) | $0.9 \times B3_T$ | 10.05 | 9.90 | 8.34 |
| | $B3_M$ | 8.23 | 8.26 | 7.81 |
| | $1.1 \times B3_W$ | 6.81 | 6.82 | 5.69 |
| (6) | $f_W/|f_2|$ | 0.44 | 0.44 | 0.44 |

As has been described above in the embodiment of the invention, it is possible to provide a zoom lens arranged to have a wide angle of view, to have high optical performance over the entire range of variation of magnification and to reduce the size of the entire lens system by appropriately setting a refractive power of each lens unit, the lens construction, the movement condition of each lens unit during the variation of magnification, etc., and to provide a photographing apparatus having the zoom lens.

What is claimed is:

1. A zoom lens comprising, in order from an object side to an image side:

a first lens unit of positive refractive power;

a second lens unit of negative refractive power arranged to move during zooming;

a third lens unit of positive refractive power arranged to move during zooming; and a fourth lens unit of positive refractive power arranged to move during zooming, wherein the interval between said first lens unit and said second lens unit is larger at a telephoto end than at a wide-angle end, the interval between said second lens unit and said third lens unit is smaller at the telephoto end than at the wide-angle end, and the interval between said third lens unit and said fourth lens unit is larger at the telephoto end than at the wide-angle end, and wherein said zoom lens satisfies the following conditions:

$$-0.50 < M4/(f_T - f_W) < -0.05$$

$$0.03 < f_W/f_1 < 0.20$$

$$0.48 < L/f_W < 1.51$$

where M4 is the amount of movement of said fourth lens unit from the wide-angle end to the telephoto end during zooming, the amount of movement M4 of said fourth lens unit taking a positive sign when said fourth lens unit moves in a direction toward the image side, $f_W$ and $f_T$ are the focal lengths of said zoom lens at the wide-angle end and the telephoto end, respectively, $f_1$ is the focal length of said first lens unit, and L is the interval on an optical axis at the wide-angle end between a lens surface having the smallest refractive power among lens surfaces included in said third lens unit and a lens surface having the largest refractive power among lens surfaces included in said fourth lens unit, the smallest refractive power and the largest refractive power being determined with positive or negative signs thereof taken into consideration, and a negative refractive power being assumed to become smaller accordingly as the absolute value thereof becomes larger.

2. A zoom lens according to claim 1, wherein said zoom lens further satisfies the following conditions:

$$0.50 < (B2_W - B2_M)/(B2_W - B2_T) < 0.75$$

$$B3_W < B3_M < B3_T$$

where $Bi_W$ and $Bi_T$ are intervals on the optical axis between the i-th lens unit and the (i+1)th lens unit at the wide-angle end and at the telephoto end, respectively, $Bi_M$ is an interval on the optical axis between the i-th lens unit and the (i+1)th lens unit at a zoom position where the focal length of said zoom lens becomes a geometrical mean $fm = \sqrt{(f_W \times f_T)}$ of the focal length $f_W$ at the wide-angle end and the focal length $f_T$ at the telephoto end of said zoom lens.

3. A zoom lens according to claim 1, wherein said zoom lens further satisfies the following condition:

$$0.35 < f_W/|f_2| < 0.80$$

where $f_2$ is the focal length of said second lens unit.

4. A zoom lens according to claim 1, wherein, during zooming from the wide-angle end to the telephoto end, said first lens unit makes an inverted motion from a movement toward the image side to a movement toward the object side.

5. A zoom lens according to claim 1, wherein said first lens unit consists of one lens element.

6. A zoom lens according to claim 1, wherein said third lens unit has a positive lens element and a negative lens element, and has at least one aspheric surface.

7. A zoom lens according to claim 1, wherein said fourth lens unit consists of one lens element.

8. A zoom lens according to claim 1, wherein said fourth lens unit has at least one aspheric surface.

9. A zoom lens according to claim 1, further comprising:

a stop arranged to move integrally with said third lens unit during zooming.

10. A photographing apparatus comprising:

a photographic lens including a zoom lens according to claim 1.

11. A photographing apparatus according to claim 10, further comprising:

a photoelectric conversion element for converting an image formed by said photographic lens into an electrical signal.

* * * * *

UNITED STATES PATENT AND TRADEMARK OFFICE
CERTIFICATE OF CORRECTION

PATENT NO.    : 6,456,441 B2
DATED         : September 24, 2002
INVENTOR(S)   : Koji Hoshi It is certified that error appears in the above-identified patent and that said Letters Patent is hereby corrected as shown below:

<u>Column 9,</u>
Line 21, (Numerical Example 1), "r18 = ∞" should read -- r18 = ∞
                                                                  *: Aspheric Surface --.
Line 53, (Numerical Example 2), "r18 = ∞" should read -- r18 = ∞
                                                                  *: Aspheric Surface --.

<u>Column 10,</u>
Line 22, (Numerical Example 3), "r18 = ∞" should read -- r18 = ∞
                                                                  *: Aspheric Surface --.

Signed and Sealed this

First Day of April, 2003

JAMES E. ROGAN
*Director of the United States Patent and Trademark Office*